INVENTORS
JOHN E. BLANDING
EDMUND C. TRAGESER &
BY JAMES VINCENT HARRINGTON their ATTORNEYS INVENTORS
JOHN E. BLANDING,
EDMUND C. TRAGESER &
JAMES VINCENT HARRINGTON
BY
their ATTORNEYS United States Patent Office 3,503,443
Patented Mar. 31, 1970

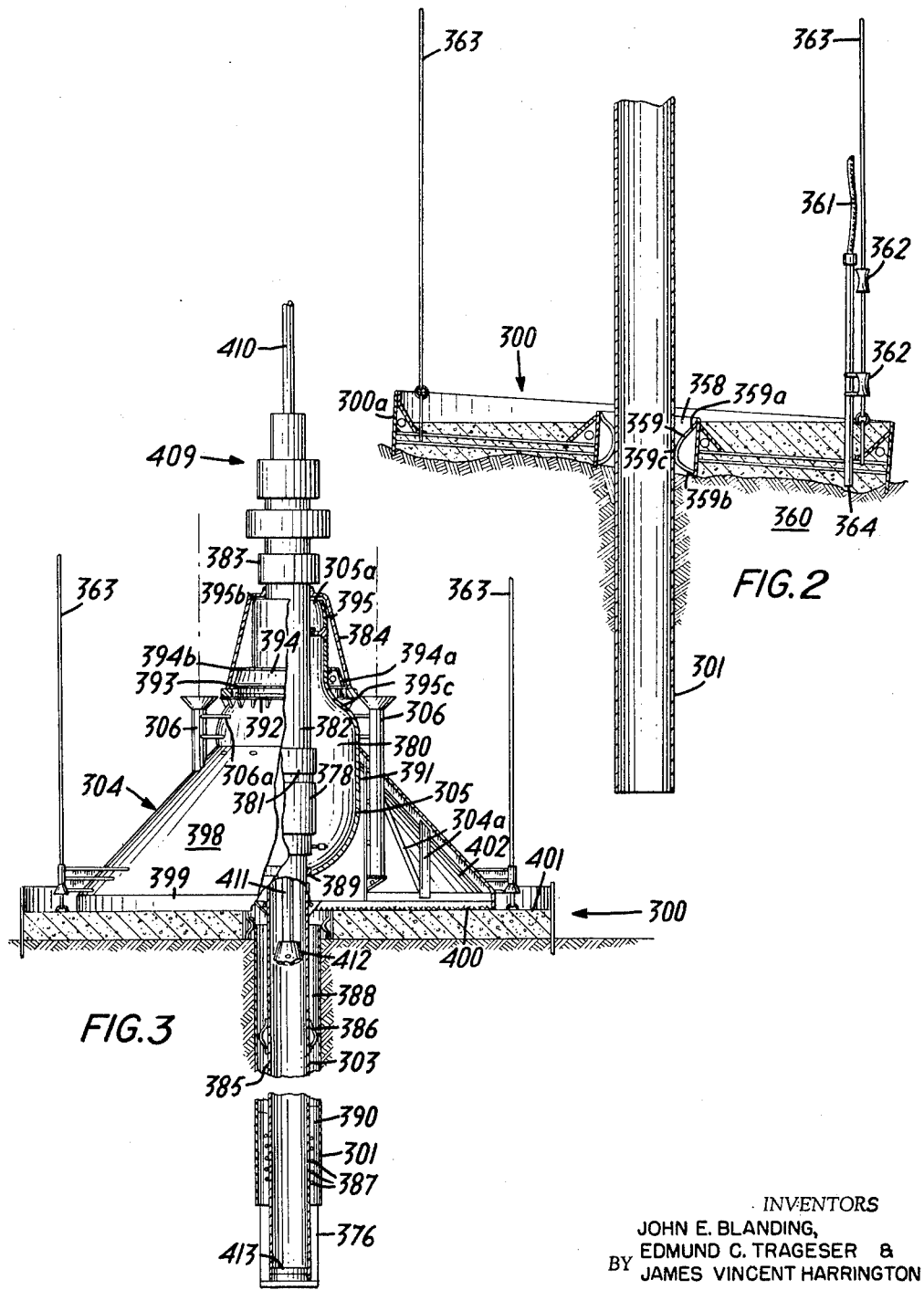

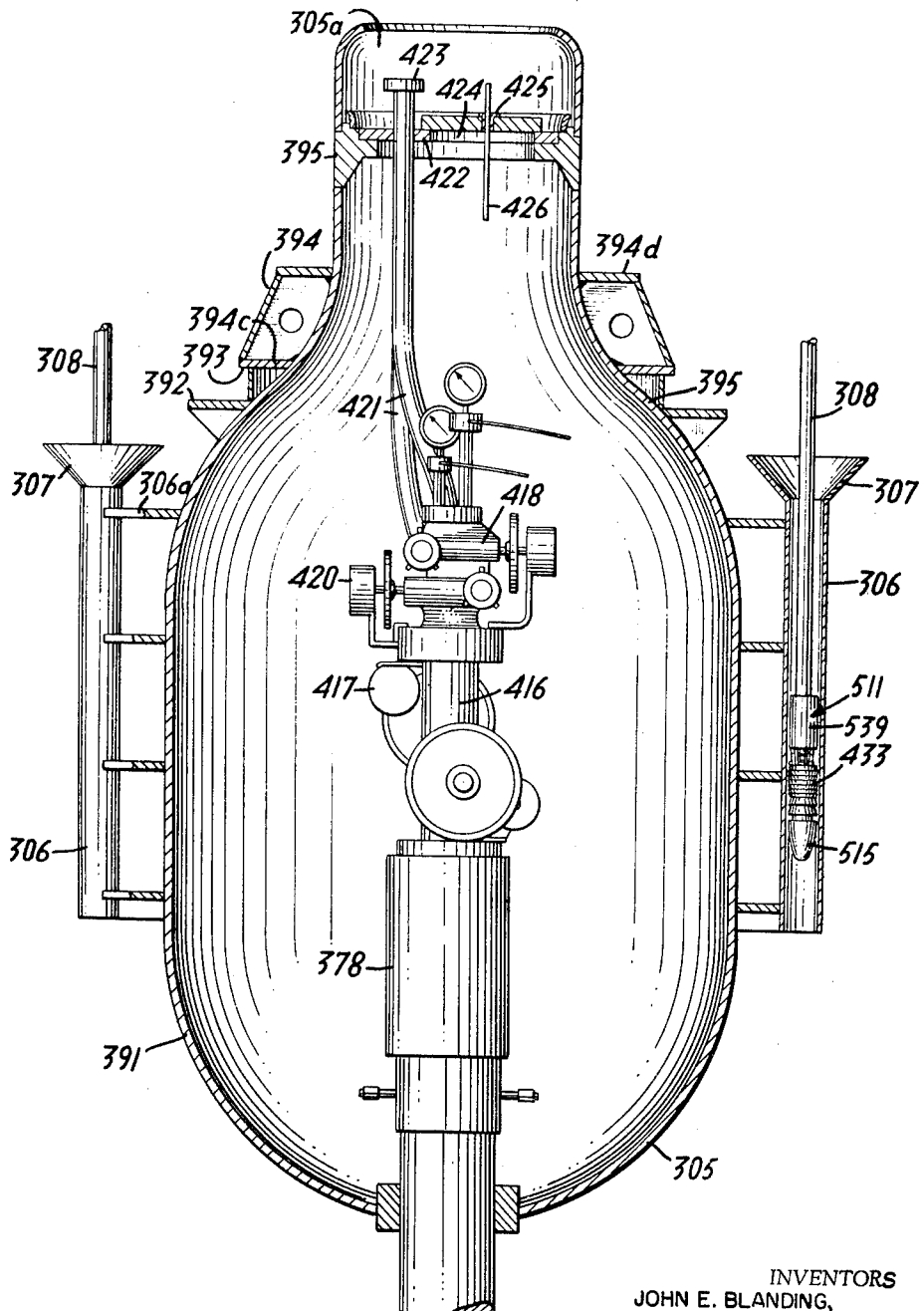

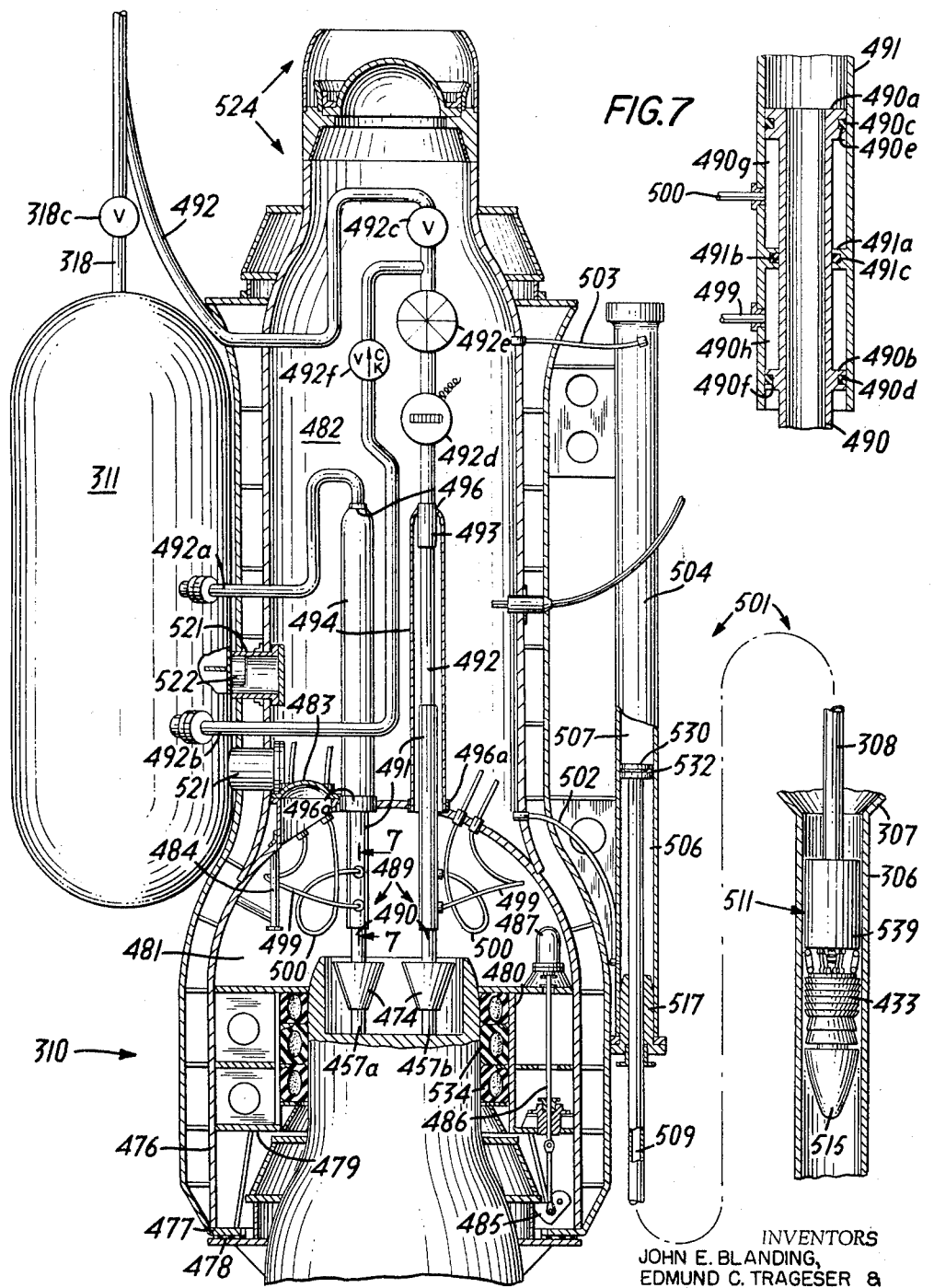

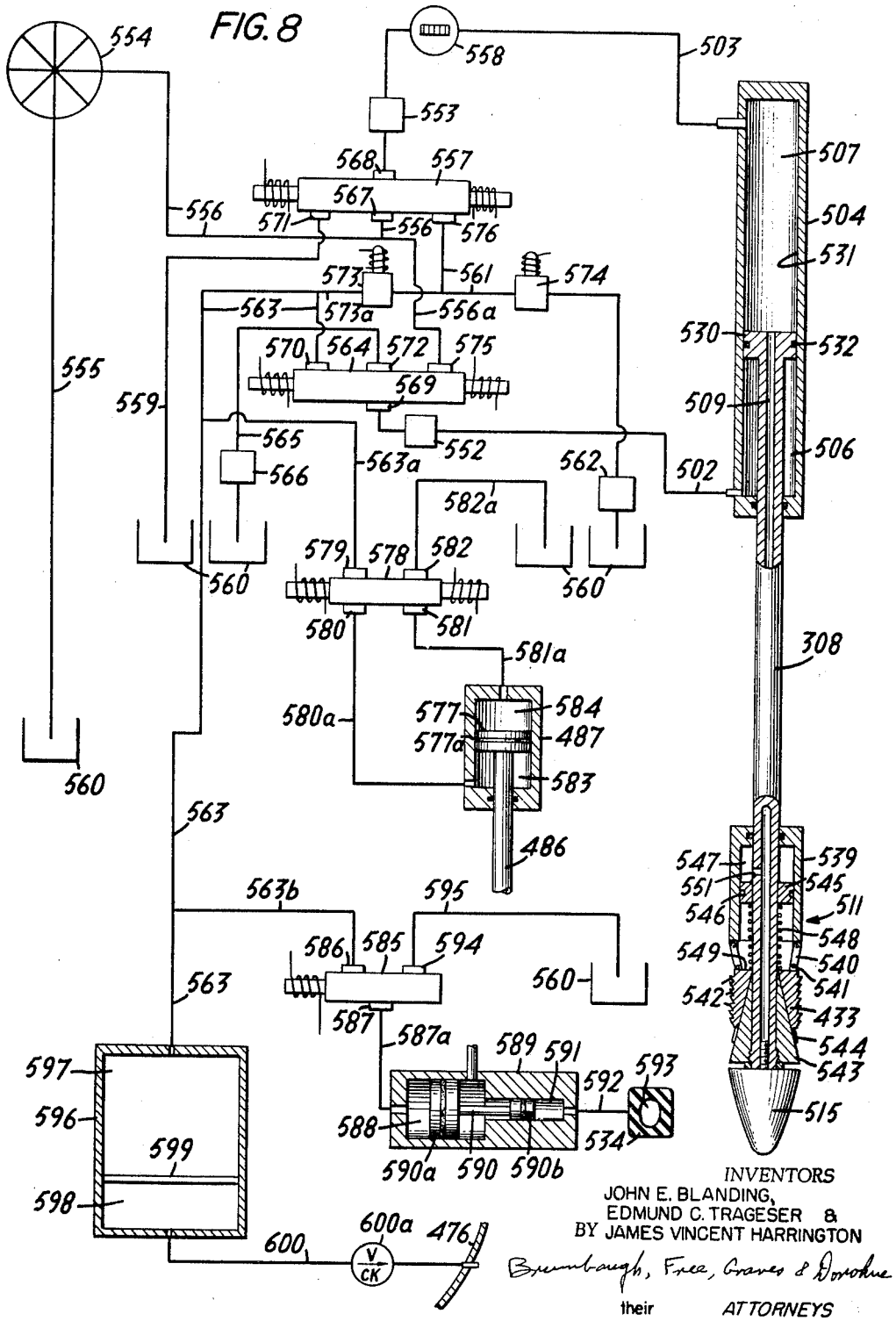

3,503,443
PRODUCT HANDLING SYSTEM FOR UNDERWATER WELLS
John E. Blanding, Old Lyme, Edmund C. Trageser, Norwich, and James Vincent Harrington, Mystic, Conn., assignors to General Dynamics Corporation, New York, N.Y., a corporation of Delaware
Original application Apr. 26, 1962, Ser. No. 193,040. Divided and this application Sept. 11, 1967, Ser. No. 671,532
Int. Cl. E21b 43/01; B63b 35/44
U.S. Cl. 166—.6
13 Claims

ABSTRACT OF THE DISCLOSURE

Production equipment is mounted adjacent to an underwater wellhead. The production equipment includes means for separating gas and oil. A tank is mounted under water for receiving and temporarily storing oil from the well. Valving directs movement of a well product from the production equipment to and from the tank and from the production equipment to a floating buoy. The gas is delivered to and flared at the buoy, and the oil is collected from the buoy by a surface vessel.

CROSS-REFERENCES TO RELATED APPLICATIONS

This is a division of our application Ser. No. 193,040, filed Apr. 26, 1962, now Patent No. 3,353,364, which in turn is a continuation-in-part of our application Ser. No. 81,543, filed Jan. 9, 1961, now abandoned.

BACKGROUND OF THE INVENTION

The present invention relates to a product handling system for underwater wells and, more particularly, to a novel and highly effective system for recovering oil from underwater wells.

The rapid depletion of the natural resources underlying the earth's land masses and the growing demand for raw materials have led to an urgent quest to develop means for exploiting deposits beneath the floor of the sea and in other areas underlying water. A number of devices have been developed for this purpose, including notably the mobile platforms now in operation off the coasts of the United States mainland. However, conventional mobile platforms and similar apparatus have not provided a complete solution to the problem.

It is an object of the present invention, accordingly, to provide new and improved means for recovering deposits such as oil from underwater wells.

SUMMARY OF THE INVENTION

The foregoing and other objects of the invention are attained by the provision of underwater well apparatus comprising production equipment mounted adjacent to an underwater wellhead, well-product-storage means mounted under water, and means connected to the production equipment and the storage means for transporting a well product therebetween. Buoy means is also provided, floatable on the water, and means connected to the buoy means and the production equipment for transporting a well product from the production equipment to the buoy means. Valve means is provided for directing movement of a well product from the production equipment to and from the storage means and from the production equipment to the buoy means.

BRIEF DESCRIPTION OF THE DRAWINGS

For an understanding of further particulars of the invention, reference may be made to the following detailed description of a representative embodiment thereof and to the accompanying figures of the drawings, in which:

FIG. 2 is a partly-sectioned elevational view of a conductor pipe and a foundation pad which are being prepared at great depth to receive a drilling capsule;

FIG. 3 is a partly-broken-away and partly-sectioned elevational view of a capsule enclosing a wellhead on the floor of the sea, the structure being particularly adapted for use in drilling in great depths of water;

FIG. 4 is a partly-sectioned elevational view of a deepwater capsule having well-completion valves in place and hydraulically-operated hold-downs from a superior chamber inserted in hold-down tubes attached to the capsule;

FIG. 6 is a partly-sectioned elevational view of separating apparatus mountable on the adaptor of FIG. 5;

FIG. 7 is a fragmentary sectional view taken along the line 7—7 of FIG. 6 and looking in the direction of the arrows;

FIG. 8 is a diagram of novel electrohydraulic apparatus for operating hydraulic hold-down tubes, latching mechanisms and inflatable seals constructed in accordance with the invention;

DESCRIPTION OF THE PREFERRED EMBODIMENTS

While for purposes of exposition the preferred embodiment is treated separately from the other two embodiments disclosed in said United States Patent No. 3,353,-364, various apparatus and methods described in connection with one embodiment may also be used in combination with apparatus and methods which are described as relating to another embodiment.

Figure 1:
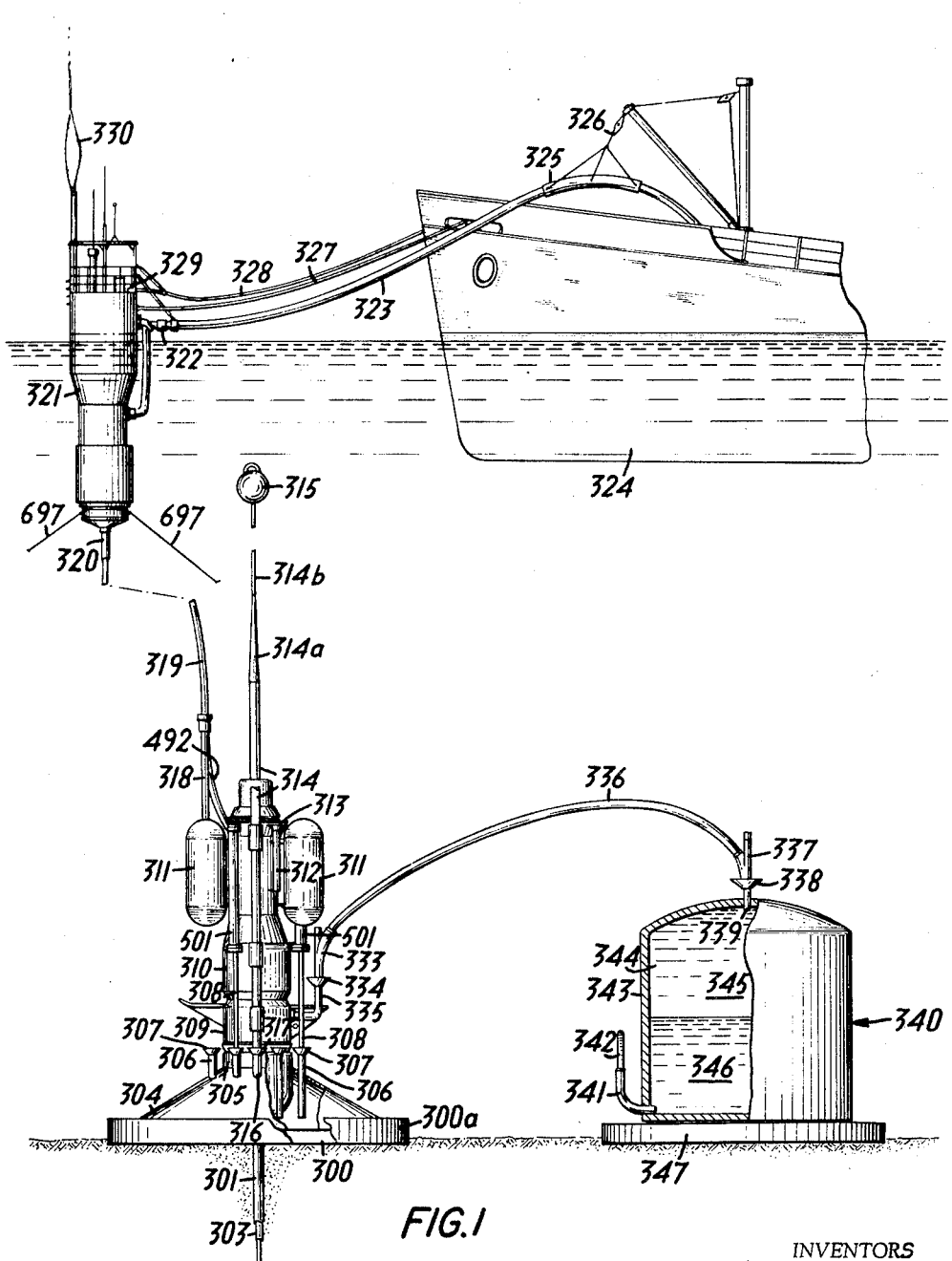
FIG. 1 is a diagrammatic view of an overall arrangement of capsule, adaptor, separating equipment, production buoy, underwater storage tank, surface vessel and other apparatus particularly adapted for use in connection with wells drilled in great depths of water.

FIG. 1 is a schematic drawing of an over-all arrangement of capsule, separating chamber, buoy, underwater storage tank and surface vessel particularly adapted for use in operating wells in great depths of water.

A reinforced poured-concrete foundation pad 300 bordered by a retaining skirt 300a is placed on the bottom of the ocean or other floor underlying water in order to mount an underwater wellhead and production equipment adjacent thereto. A conductor pipe 301 extends from a hole (not shown in FIG. 1) in the pad 300 into the floor of the ocean, and casing means 303 is inserted through the conductor pipe 301.

A foundation-pad cover 304 extends from the pad 300 to a capsule 305. Hold-down tubes such as the tubes 306 are held stationary with respect to the capsule 305 and are adapted in a manner hereinafter described to hold down various chambers sent down from the surface. Frustoconical members or "entrance cones" 307 at the upper ends of the hold-down tubes 306 are adapted to guide apparatus such as hold-downs 308 into the hold-down tubes 306. An adaptor chamber 309 is designed to fit on the top of the capsule 305 and support at its upper end a separator chamber 310 bearing one or more separators 311 and one or more hold-down tubes such as the hold-down tube 312. The hold-down tube 312 has an entrance cone 313 adapted to receive a hold-down from, for example, a personnel carrier such as the one shown in FIG. 9.

Rigid guide members 314 (the nearer of which is broken away to allow a view of the farther) having portions 314a tapering upwardly terminate in guide cables 314b which are attached to a small marker buoy 315. The lower end of the guides 314 are secured by hold-down tubes 316 provided with entrance cones 317. The hold-down tubes 316 are held stationary with respect to the capsule 305.

One of the separators 311 is shown provided with means such as a rigid discharge line 318 which communicates with a flexible discharge line or trunk 319 for transporting a well product such as natural gas. A line 492 extending from the chamber 310 is also incorporated into the line 319 and may carry another well product such as oil. The lines 318 and 492 are separate from each other within the line 319. The gas and oil products at the well are, of course, initially mixed with each other but are separated from each other by the separators 311 if they are to be stored on the sea floor, as hereinafter more fully described. The upper end of the flexible discharge line or trunk 319 is coupled to a rigid connection 320 mounted in a production buoy 321 which is floatable on the water and supports the weight of the line 319. The oil entering the buoy 321 through the connector 320 is discharged through a quick-connect coupling 322 and a flexible discharge line 323 or other means for transporting a well product to a surface vessel such as a pickup tanker 324. The flexible discharge line 323 is supported by a cradle 325 suspended from a tackle 326.

The pickup tanker 324 conveniently may moor to the buoy 321 by means of a mooring line 327 and supplies power to pumping apparatus located on the bottom and preferably in the separator chamber 310 through a power cable 328 attached to the buoy 321 through a watertight connection 329. It also may collect oil or another well product from a storage tank 340 and the well itself.

During periods when they are not in use, the discharge, power and mooring lines 323, 328 and 327 may be carried aboard the tanker 324. In any event, they should be made in lengths sufficient to permit the tanker to remain at a safe distance from a flare 330 which may be lighted on the buoy 321 to oxidize waste gases.

A remote connector 333 is inserted into a cone 334 which is mounted in an oil discharge line 335 extending from the adaptor 309. A flexible discharge line 336 or other means for transporting a well product leads from the connector 333 to a remote connector 337 inserted into a cone 338 and a first aperture or port 339 in the tank 340. Valve means shown in FIG. 6 and hereinafter described controls the flow of the well product to and from the tank 340 and to the buoy 321.

The tank 340 is open to liquid flow to and from the sea through a second aperture or water pipe 341 disposed in vertically-spaced relation to the aperture 339. The pipe 341 is equipped with a strainer 342. The tank 340 has a shell 343 preferably of reinforced concrete, and its interior cavity 344 is adapted to contain crude oil 345 floating on sea water 346. Attached to the shell 343 in supporting relation thereto is a foundation pad 347 which may also act as ballast if required.

Workmen skilled in the art will understand from the preceding description that, as the aperture 339 admits or exhausts a well product to or from the tank 340, the second aperture 341 automatically exhausts or admits an equal volume of water, so that the tank 340 is continuously under substantially equal interior and exterior pressures.

The tank 340 is lowered from the surface of the sea and located in proper relation to the capsule 305 by means of a conventional spacer or jig (not shown). The line 336 may then be attached to the remote connectors 333 and 337, which, guided by a conventional jig of construction similar to that of the one used in placing the tank 340 on the bottom, are inserted into the cones 334 and 338, respectively.

The tanker 324 makes periodic trips to the well site, where it collects oil from the tank 340 and from the separator chamber 310. The tanker 324 thus serves as a second well-product-storage or collection means.

FIG. 2 shows a preferred method of preparing the novel foundation pad 300. A frame or retaining skirt 300a and associated steel framework are provided with a center aperture, trunk or hole 358 adapted to pass casing means therethrough and drill-string-centering devices or members 359.

The frame 300a is adapted to be lowered to an underwater floor and there to receive and mold a freshly-mixed setting compound such as cement to form the anchor pad 300. The centering devices or members 359 comprise a plurality of substantially U-shaped members each having its ends 359a and 359b attached to the walls of the aperture and a mid-portion 359c extending to a position displaced radially inwardly from the walls and adapted to abut the casing means. The devices or members 359 position the casing 301 in equally spaced-apart relation to the walls of the aperture 358 and may be spaced at substantially equal intervals about the aperture 358. By means of cables 363, the pad 300 is lowered about the conductor pipe 301, which has been forced into an uneven sea bottom 360 to the point of refusal. The lower edge of the skirt 300a typically penetrates the sea bottom 360 to some extent. In order to pour concrete within the skirt 300a, one or more means for depositing a freshly-mixed setting compound such as pipes or ducts 361 are attached to guides 362 which are slidably mounted on the lowering cables 363. The mouth 364 of the duct 361 is placed at or near the bottom of the cavity to be filled. Concrete or cement discharged into water from a mouth so placed sets into a hard mass, whereas concrete allowed to fall a considerable distance through water becomes dispersed and fails to set. The depositing means or duct 361 may be raised and lowered, so that the distance moved by the setting compound from the depositing means 361 to a position of rest is adjustable. Generally, the depositing means 361 is raised gradually as the cementing operation progresses.

FIG. 3 shows the foundation pad 300 after its construction by the novel method described in connection with FIG. 2.

The conductor pipe 301 has been cut off in a manner similar to the manner in which the pipe 100 is cut off (FIG. 7 of said United States Patent No. 3,353,364). The cutting may be effected by any one of a number of means conventional in the drilling of oil wells. The conductor pipe above the point of severance is withdrawn to the surface and stored for future use on another well.

The crew on the floating surface rig make up a string of the capsule-support casing 303 having a length equal to the ground-penetration depth of the conductor pipe 301 or to the depth of the bottom of an additional hole 376 drilled below the bottom of the conductor pipe 301. The capsule-support casing 303 is guided into the conductor 301 with the aid of the cables 363. At a proper point along the length of the capsule-support casing 303, a hollow watertight capsule 305 is permanently attached thereto. A wellhead 378 is installed within the capsule interior 380 after the capsule 305 is in position on the ocean bottom. A lower safety joint 381 secures the upper end of the wellhead 378 to the lower end of a wellhead extension 382 having the lower part of an upper safety joint 383 attached thereto.

A protective skirt 384 integral with the extension 382 is adapted to prevent fouling of or other damage to the upper surfaces of the capsule 305 during the drilling operation.

On the outer surface 385 of the capsule-support casing 303 centering devices 386 are secured by welding or other suitable means.

After the capsule 305 and the capsule-support casing 303 have been properly centered in the hole, cement 390 is forced by conventional means as far as possible up into the annular space 388 between the conductor pipe 301 and the capsule-support casing 303. Inasmuch as the capsule-support casing 303 is generally short as compared to a string of casing passing therethrough, the annular space 388 is typically filled throughout its entire length. Wires 387 attached to and extending circumferentially of the capsule-support casing 303 improve the shear strength of the concrete 390.

The load-carrying ability of the wellhead 378 is a function of the quality of the cement work even when, owing to a condition such as underconsolidation of the sea bottom 360, it is necessary to hang casing strings from a point below the wellhead 378 to minimize column load on the conductor pipe 301.

After the cementing operation has been completed and the water has been pumped out of the capsule 305, the capsule may be entered by a work crew who descend thereto in a personnel chamber.

The capsule 305 has a shell 391 designed to withstand the pressure of the sea at its intended location while maintaining within a pressure of one atmosphere. A base ring 389 or other suitable reinforcing member is attached to the shell 391 at its lower end, and a landing ring 392 on which chambers such as the protective skirt 384 land is attached to the shell near its upper end.

A latching groove 393 formed in or below an upper reinforcing ring or collar member 394 attached to the shell 391 above the landing ring 392 (see also FIG. 4) facilitates hold-down of a variety of chambers in a manner described more fully in connection with FIGS. 5, 6, and 8. A sealing neck 395 is formed at the upper end of the shell 391 and about an aperture 305a in the capsule 305. A similar sealing neck may be formed on the other submersible chambers illustrated in the third embodiment of the invention. The sealing neck 395 is hollow and generally cylindrical but has an end 395b which is "rolled home" or curved inwardly and an end 395c which flares into the walls of the capsule 305. All of the sealing necks are sealably insertable in mating openings formed in the lower portions of all the submersible chambers (except, of course, the capsule 305, protective skirt 384 and tank 340).

The collar member 394 is generally frusto-conical, its larger base 394a being nearer the end 395c of the neck 395 and its smaller base 394b being nearer the end 395b of the neck 395. Flat annular members 394c and 394d connect the bases of the collar member 394 to the neck 395. The groove 393 is between the neck 395 and the annular member 394c connecting the larger base 394a of the collar member 394 to the neck 395.

Hollow elongated tubular members such as holddown tubes 306 (see also FIG. 1) are two of six identical tubes which are spaced at equal intervals about the periphery of the capsule shell 391 and permanently attached to the exterior thereof by means such as supports 306a. The holddown tubes 306 are open at their upper ends, which are provided with hollow generally frusto-conical members 307 for guiding hold-down apparatus into the tubes 306. The operation of the hold-down mechanism is described more fully in connection with FIG. 8.

The foundation-pad cover 304 surrounding the shell 391 and abutting it comprises structural members 304a as required, a frusto-conical member or sheet 398 having its smaller base uppermost and connected to the capsule 305 and its larger base lowermost and connected to the anchor pad 300, and a skirt 399. Along its circumference, the skirt 399 is provided with a backing mesh 400 or other suitable means to facilitate proper union between the skirt 399 and the upper surface 401 of the reinforced-concrete pad 300. After the installation at the wellhead is otherwise complete, the volume 402 bounded by the surface 401, the sheet 398, and the capsule 305 may be filled or partly filled with cement.

The rigid guide members 314, which serve as permanent guides, are then installed, and the cables 363 cut off or otherwise removed.

FIG. 3 also illustrates an assembly 409 of conventional cellar gates and blowout preventers mounted atop the upper safety joint 383. The assembly 409 is removed and replaced by similar equipment of different sizes as the drilling progresses.

A drill string 410 having a collar 411 and supporting a bit 412 is advanced to drill out a plug 413 formed during the cementing operation and to effect any additional drilling which may be necessary.

Figure 9:
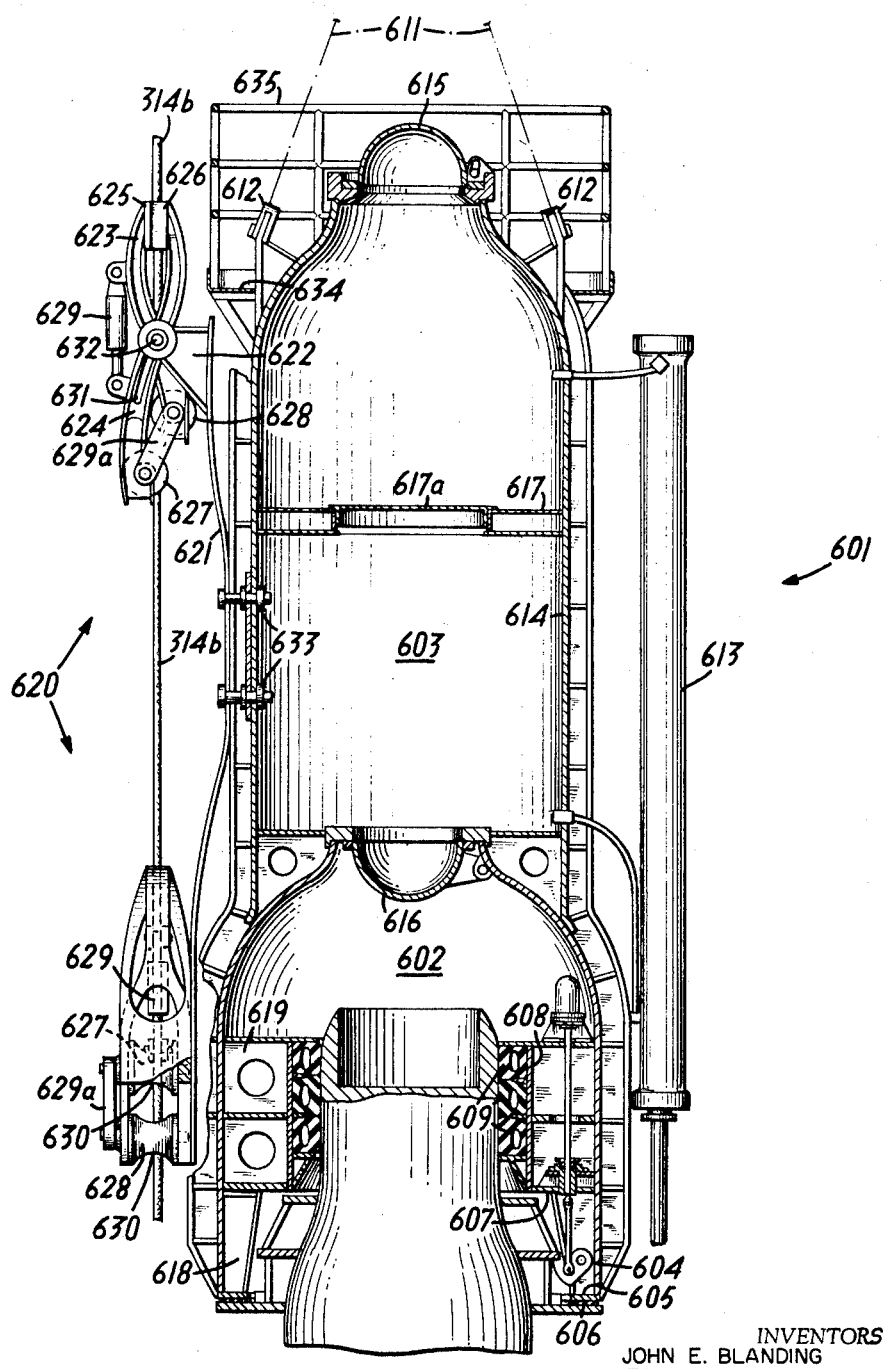
FIG. 9 is a partly-sectioned elevational view of a centerline elevator or submersible personnel chamber constructed in accordance with the invention.

After the placing and cementing of the capsule support casing 303, the drilling and the casing of the well proceed as though the well were on shore, except that, whenever it is necessary to work on the wellhead equipment, the wellhead is visited by personnel in a service chamber which may be, for example, of the type shown in FIG. 9.

FIG. 4 illustrates the capsule 305 during the production cycle. The capsule 305 is shown as unitary but may be divisible as the capsules 116 and 212 (FIGS. 8 and 12 of said United States Patent No. 3,353,364) of the second embodiment are. The capsule 305 has a dual-completion head facilitating the production of oil from two zones. The wellhead 378 is of the full-bore type, whereon all gauges are remote-reading and all valves are remote-actuated. Such gauges and valves are well known in the art and need not be further described here.

After the installation of a master valve 416, its remotely-controlled actuator motor 417, a flow-control valve 418 and its remotely-controlled motor 420, tubing 421, or other means for delivering a well product, is installed. The tubing 421 extends through the capsule 305 and sealably through a capsule cover 422 and terminates in flanges 423 (only one of which is shown). A mixed well product such as oil and gas flows upwarly through the tubing 421. The capsule cover 422 has an access manhole 424 with a stuffing box 425 mounting electrically-conducting means such as an electrical conductor 426. The conductor 426 is in electrically-insulated relation to the capsule 305. In order to confine the wellhead pressure to the capsule 305 and to simplify the pipe-fitting problem in other chambers, one or more flow-control valves such as the valve 418 are preferably located within the capsule 305 as shown.

On the exterior of the capsule 305 and attached to the capsule shell 391 are the holddown tubes 306 having the conical entrance guides 307, as FIGS. 1 and 3 also show. The hold-down tubes 306 are adapted to receive hold-downs (from, for example, a superior chamber). The hold-downs 308 are tubes or hollow shafts vertically movable with respect to a superior chamber in a manner explained in connection with FIGS. 6 and 8. The hold-downs 308 have at their lower ends hydraulically-operated slips such as the slips 433, actuatable in a manner hereinafter explained to prevent upward movement of the hold-downs 308 with respect to the capsule 305. The capsule 305 may be provided with conventional storm chokes or down-hole valves for automatic down-hole shut-off.

A variety of hold-down tubes may be spaced at positions around a capsule or other chamber. The hold-downs of each type may be arranged at equal intervals around the periphery of the capsule. Thus, a different set of hold-down tubes may be disposed about the capsule for each of the chambers to be lowered to the capsule, each set of hold-down tubes being adapted to receive the hold-downs of a particular type of chamber.

Inasmuch as the exterior form of the groove 393, the ring 394 and the neck 395 is identical for all of the submersible chambers, any chamber can be attached to any other. The rolling home of the upper edge 395a of the neck 395 facilitates the attachment of chambers above it.

Figure 5:
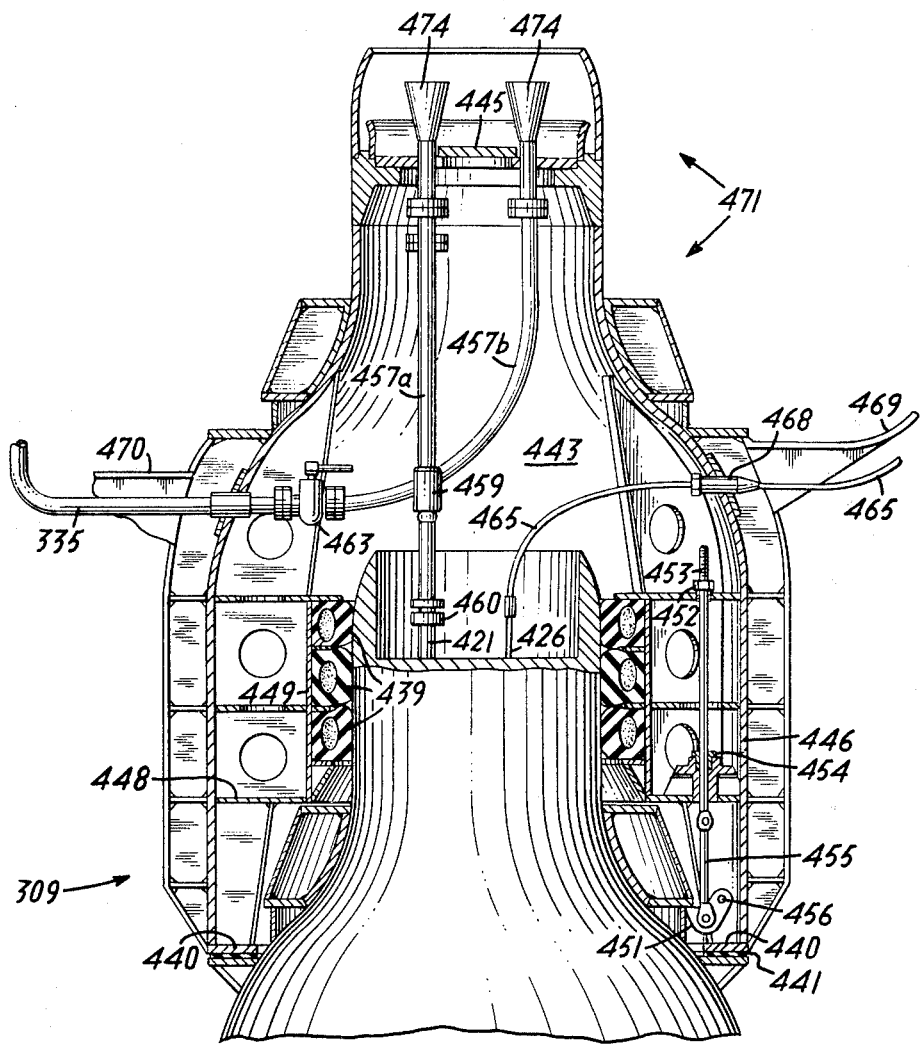
FIG. 5 is a partly-sectioned elevational view of a novel adaptor for use with the capsule shown in FIG. 4.

FIG. 5 shows in detail—and from the side opposite that shown in FIG. 1—the next-to-lowest chamber shown in FIG. 1, the adapter 309. Its function is to provide an area in which connections may be made with the capsule 305, the storage tank 340, and superior chambers. It is a hollow two-ended generally tubular member having a shell 446 open at the bottom to the sea until it is secured to a lower chamber such as the capsule 305. The adaptor 309 is designed to be lowered from the water's surface attached beneath a personnel chamber such as the one shown in FIG. 9 and to be connected to the capsule 305 by personnel within the chamber. Sealing members such as a plurality of annular seals 439 mounted within the adaptor 309 circumferentially of a hole or trunk 449 for receiving the neck 395 (FIG. 4) are inflatable by personnnel within the personnel chamber to establish a seal between the lower end of the adaptor and a sealing neck inserted therein.

The adaptor 309 has an interior configuration at its lower end substantially complemental to the sealing neck 395. More particularly, it is complemental to the sealing neck 395, the latching groove 393, the collar member 394, and the landing ring 392. Thus, the adaptor 309 can be lowered over the sealing neck 395 until a sealing ring 440 to which is attached a sealing gasket 441 is in firm contact with the landing ring 392 (FIGS. 3 and 4). Evacuation of water from the interior 443 of the adaptor 309 by any suitable means sets the sealing gasket 441 firmly. The sealing members 439 are then inflated to improve the seal between the adaptor 309 and the sealing neck 395.

A hatch 445 near the upper end of the adaptor 309 gives workmen access to the interior 443 after it has been evacuated of water and filled with air at a pressure of about one atmosphere and therefore to the capsule 305.

The adaptor 309 thus functions as a sealed vessel, its watertight integrity being maintained by the shell 446, the gasket 441, an interior ring 448 welded to the shell 446 and to a seal-support trunk 449, sealing members 439, and either a superior chamber sealably encompassing the upper portion 471 or the hatch 445 and associated structure at the upper end of the adaptor 309.

Latching means such as the latch 451 spaced, preferably at equal intervals peripherally about the members 439 near the shell 446 at the end thereof opposite the portion 471 are actuated manually by tightening a nut 452, thereby retracting a threaded shaft 453 through a stuffing box 454 and lifting a toggle 455. The latch 451 is pivoted by the moving toggle 455 about a pin 456 held stationary with respect to the shell 446. Thus, the latch 451 firmly engages the upper reinforcing ring 394 in the latching groove 393 (FIG. 4) and holds the adaptor chamber 309 to the capsule 305.

Flow lines or tubing 457a or other means for delivering oil or another well product are attached to the tubing 421 (see also FIG. 4) by make-up adaptors 459 and 460. The flow lines 457a and a line 457b (which carries oil either upwardly towards the tanker 324 or downwardly towards the tank 340 in a manner hereinafter described) are fitted at their upper ends with remote connector guide cones 474.

The storage discharge line 457b is coupled to the storage discharge line 335 through a stop valve 463 which prevents flow of sea water from the line 335 to the line 457b during installation and servicing. The line 335 is passed sealably through the shell 446 in a conventional manner.

Electrically-conducting means such as an electrical connector 465 passed into the interior space 443 through a stuffing tube 468 while the adaptor 309 is on the surface is attached to the capsule electrical conductor 426 (see also FIG. 4). The connector 465 is in electrically-insulated relation to the adaptor 309. A brow 469 integral with the shell 446 and extending outwardly therefrom guards the electrical conductor 465 against damage by hold-down apparatus of superior chambers, and a similar brow 470 protects the storage discharge line 335.

The adaptor 309 is normally lowered and attached to the capsule 305 and thereafter left permanently. However, it can be removed by reversing the installation procedure described above.

The upper portion 471 of the adaptor 309 comprises a landing ring, latching groove, reinforcing ring or collar member and sealing neck, all of which have the same configuration as the landing ring 392, latching groove 393, upper reinforcing ring 394 and sealing neck 395 of the capsule 305, so that a variety of additional chambers may be lowered and attached to the adaptor 309 or substituted therefor on the capsule 305.

FIG. 6 shows the separator chamber 310 in detail. The chamber 310 comprises a lower shell 476, a landing ring 477 integral with and extending inwardly from the lower end of the shell 476 and provided with a peripheral gasket 478, an interior ring 479 integral with and extending inwardly from the shell 476 at a point above the ring 477, and an annular inflatable seal trunk 480 extending upwardly from the inner end of the ring 479. The upper portion 524 of the separator chamber 310 is shaped identically to the sealing neck 395 and associated structure, and the interior configuration of the lower end of the chamber 310 is substantially complemental to the exterior configuration of the sealing neck 395 and the other sealing necks disclosed herein.

In a manner which in the light of the preceding disclosure will be understood by workmen skilled in the art, the lower part of the chamber 310 forms with the chamber on which it is mounted, such as the adaptor 309, a watertight enclosure 481 which can be entered by workmen after it has been evacuated of water and supplied with air at a pressure of about one atmosphere and which therefore serves as a passage to the adaptor 309 and capsule 305. Entrance from the separately-enclosed upper compartment 482 of the chamber 310 to the watertight enclosure 481 is by way of a hatch 483 sealing an opening in the upper portion of the shell 476 and a ladder 484 extending from a point immediately beneath the hatch 483 downwardly into the space 481.

Mechanical locking of the chamber 310 to the adjacent lower chamber is performed by a number of peripherally-spaced latches such as the latch 485 similar in construction and operation to the latch 451 (FIG. 5), except that the latch 485 is remotely controllable by a hydraulic means including a ram extension 486 and a ram chamber or cylinder 487. The operation of the ram 486 and ram chamber 487 is set forth in connection with the description of FIG. 8.

One or more hollow watertight separators such as the separator 311 are mounted on the separator chamber 310. The separators 311 are provided with indicator trunks 521 which penetrate the chamber 310 in the manner shown. A liquid level indicator 522 may be incorporated into one of the indicator trunks 521.

Remote-connector devices 489 adapted to enter the remote-connector guide cones 474 of the adaptor 309 (FIG. 5) comprise tube latching mechanisms 490, extensor sleeves 491, inner tubular members such as pressure tubes 492 and 492a and tubing doublers 493 (only one of which is shown) and outer tubular members such as tubing supports 494. Given parts of the tubing supports 494 are attached to support means such as the shell 476 and support the weight of the remote-connector devices 489. The attaching of the pressure tubes 492 and 492a and the tubing doublers 493 to the tubing supports 494 at points 496 displaced longitudinally of the tubular members 492, 492a and 494 from the points 496a of connection of the tubular members 494 with the shell 476 and from the points of connection of the latching mechanisms 490 within the guide cones 474 permits moderate lateral movement of the latching mechanisms 490 and their guidance within the cones 474 to a proper connection with lower tubes such as the flow lines 457a and 457b (see also FIG. 5). Thus, by providing freedom of movement, less accuracy in the fabrication of the connecting parts is required and successful remote coupling is facilitated.

Workmen skilled in the art will understand that a mixed well product such as oil and gas from an underwater well may be separated by the separator 311 attached to the chamber 310. Essentially, the apparatus of FIG. 6 comprises first tubing means for transporting a mixture of oil and gas from an underwater well from the chamber 310 to the separator 311, which separates the oil and gas, second tubing means for transporting the separated oil from the separator 311 back to the chamber 310, third tubing means extending from the chamber 310 to the surface, fourth tubing means extending from the chamber 310 to underwater storage means, and valve means connected to the third and fourth tubing means for selectively connecting the second tubing means to one of the third and fourth tubing means. Fifth tubing means may be extended from the separator 311 directly to the water's surface for discharging gas separated from the oil.

More particularly, a mixture of oil and gas rising from an underwater well in a line 457a (FIG. 5) rises through the line 492a (FIG. 6) with which the line 457a is connected and passes into the separator 311.

The oil and gas are separated in the separator chamber 311, the gas rising through the line 318 and a valve 318c (see also FIG. 1) and the oil returning to the chamber 310 through a line 492b. The gas is generally burned to form the flare 330 shown in FIGS. 1 and 10, and the oil is normally delivered to the tank 340 shown in FIG. 1, where it is stored until picked up by the tanker 324.

The line 492b communicates with the line 492 at a point between a normally-closed valve 492c and a normally-open valve 492d. A pump 492e, operated by a battery (not shown) during periods when the tanker 324 is not on station at the well and by the power from the tanker 324 during periods when the tanker 324 is present, facilitates movement of the oil downwardly through the line 492 and the line 457b (FIG. 5) and through the lines 335 and 336 to the tank 340.

When the tanker 324 is on station at the well for the purpose of picking up oil from the tank 340, the valves 492c and 492d are both open, and the pump 492e is reversed to pump oil from the tank 340 through the lines 336 and 335 (FIGS. 1 and 5) and upwardly through the lines 457b and 492.

Simultaneously, oil which is being produced at the well and which rises in the line 457a and passes into the separator 311 and back through the line 492b can pass into the line 492, provided the oil is under sufficient pressure. A check valve 492f in the line 492b permits passage of oil from the line 492b to the line 492 but not in the reverse direction.

The latching mechanisms 490 are controlled by hydraulic operating lines 499 and 500 extending from the upper compartment 482 through the shell 476. The lines 499 and 500 are pressurized by remote control of a small pump 554 (FIG. 8). The latching mechanisms 490 can thus be extended in a direction opposite to the direction of displacement of the points 496 from the points 496a to effect a fluid coupling between the tubing 492 and 492a on the one hand and the tubing 457b and 457a on the other.

As FIG. 19A shows, each of the extensor sleeves 491 has an annular inwardly-projecting shoulder 491a which fits tightly about the associated latching mechanism 490. Annular packing 491b in an inwardly-facing annular groove 491c insures a tight seal about the latching mechanism. Each latching mechanism 490 is formed with outwardly-facing annular shoulders 490a and 490b disposed respectively above and below the shoulder 491a. Annular packing 490c and 490d in outwardly-facing annular grooves 490e and 490f, respectively, insure a tight seal with the interior wall of the extensor sleeve 491. Cavities 490g and 490h are thus formed between the extensor sleeves 491 and the latching mechanisms 490. When a fluid such as oil is supplied to the cavity 490g through the line 500 and exhausted from the cavity 490h through the line 499, the latching mechanism 490 is raised; conversely, when fluid is supplied to the cavity 490h through the line 499 and exhausted from the cavity 490g through the line 500, the latching mechanism 490 is lowered.

The same pump which pressurizes the lines 499 and 500 also powers a hydraulic hold-down assembly 501 (see also FIG. 1) which comprises hydraulic operating lines 502 and 503, a cylinder 504 rigidly attached to the chamber 310 and having a lower cavity 506 and an upper cavity 507, and the hold-down 308. The hold-down 308 is double acting, retraction being effected by a pressure equal to sea pressure in the lower cavity 506 acting against atmospheric pressure in the upper cavity 507.

The hold-down 308 has throughout its length a channel 509 through which hydraulic fluid is supplied to gear 511 for operating the internal slips 433.

A generally conical nose 515 on the lower end of the slips 433 facilitates entrance of the slips 433 and the gear 511 into the frusto-conical entrance guide 307 of the hold-down tube 306.

The lower end of the cylinder 504 is closed by a gland 517 through which the hold-down 308 is extensible.

When they are set by means of the hydraulic circuitry shown in FIG. 8, the internal slips 433 or other expansible securing means prevent upward movement of the hold-down 308 with respect to the hold-down tube 306 (see also FIGS. 1, 3 and 4).

The hydraulic circuitry shown in FIG. 8 is adapted to operate not only the hydraulic hold-down assembly 501 and the expansible securing means at the lower end thereof but also the latches 485 and the inflatable annular seal 534 (FIG. 6). The hold-down mechanism comprises the cylinder 504 having the lower cavity 506 and the upper cavity 507. The ram extension or hold-down 308 is free to move within the cylinder 504, and a ram 530 is sealed against the interior wall 531 of the cylinder 504 by a gasket 532 or other suitable device. Hydraulic pressure can be applied to the lower cavity 506 through the line 502 and to the upper cavity 507 through the line 503.

The conical nose 515 is located at the lower end of the ram extension or hold-down 308. The operating gear 511 for the slips 433 comprises a retractor cylinder 539 adapted to seal about and slide upon the outer surface of the ram extension or hold-down 308. Slip links 540 secure the lower portion of the retractor cylinder 539 to lugs 541 integral with the slips 433. The outer surfaces of the slips 433 are provided with horizontally-extending teeth or serrations 542 which, when in the lower, expanded, gripping or set position, engage the inner wall of the hold-down tube 306 and prevent upward movement of the hold-down 308 with respect to the hold-down tube 306.

In FIG. 8 the slips 433 are shown in the upper, contracted or retracted position. Movement of the slips 433 along ramps 543, which have outer surfaces inclined to a reference line, such as the axis of the hold-down 308, is guided by keys or slides 544, which may be, for example, T-shaped in cross section. A stop 545 provided with a peripheral sealing gasket 546 is integral with the ram extension 308 and serves as the bottom of the retractor cylinder cavity 547. A compression coil spring 548, or other biasing means, here shown in a position of maximum compression, abuts the lower face of the stop 545 and the upper surface 549 of the slips 433.

Hydraulic fluid is supplied to the retractor cavity 547 from the channel 509 drilled or otherwise formed in the ram extension 308 through an aperture 551 formed in a portion of the ram extension 308 lying within the retractor cylinder cavity 547.

Retraction of the internal slips 433 is effected by adjusting the pressures in the hydraulic operating lines 502 and 503 so that sufficient pressure is transmitted to the retractor cylinder cavity 547 to overcome the force of the coil spring 548 and force the slips 433 upwardly and inwardly along the ramps 543. By properly balancing the pressures within the lower cylinder cavity 506 and the upper cylinder cavity 507, the hold-down or ram extension 308 can be made to "inch" or move slowly in either direction. To this end, throttling valves 552 and 553 are provided in the lines 502 and 503, respectively.

A suction line 555, a pump 554, a cylinder-supply line 556, a multiple-position valve 557, and the line 503 supply hydraulic fluid to the upper cavity 507. A meter 558 in the line 503 shows the value of the instantaneous fluid-flow vector. The line 503, the valve 557, and either an atmospheric discharge line 559 discharging to a sump 560 or a regulated-pressure-discharge line 561 containing an adjustable relief valve 562 and also discharging to the sump 560 exhaust fluid from the upper cavity 507.

A submergence sea pressure line 563, a multiple-position valve 564 and the line 502 supply fluid to the lower cavity 506. The line 502, the valve 564, the portion of the line 563 adjacent to the valve 564, a line 573a, and the portion of the line 561 between the junction of the line 561 with the line 573a and the point of discharge of the line 561 into the sump 560 form a first discharge system for discharging fluid from the lower cavity 506, and the line 502, the valve 564 and a regulated-pressure-discharge line 565 containing an adjustable relief valve 566 form a second. A portion of the regulated-pressure discharge line 561 is thus common to the upper and lower cylinder discharge systems.

In operating the mechanism shown in FIG. 8, it is necessary first to advance and engage the slips 433 and then to exert a downward holding force on the cylinder 504.

Let it be assumed that the annular area of the ram 530 exposed to the pressure in the lower cavity 506 is half as great as the area of the ram presented to the pressure in the upper cavity 507 and that initially the slips 433 are expanded and the fluid within the cavities 506 and 507 is at sea pressure. All of the movable parts shown in FIG. 8 are then at rest, inasmuch as the total force exerted on the ram 530 by the fluid in the upper cavity 507 is equal to the force exerted on the ram by the fluid in the cavity 506 plus the force exerted on the ram by the ram extension 308 as a result of sea pressure on the apparatus extending from the cylinder 504. If the pressure in the upper cavity 507 is increased to sea pressure plus 150 lbs. per sq. in. and that in the lower cavity 506 to sea pressure plus 300 lbs. per sq. in., the ram 520 remains substantially at rest, because the products of (a) the increased pressures in the cavities and (b) the areas on the ram head 530 against which they respectively act are equal. However, the increased pressure in the upper cavity 507 is transmitted through the channel 509 and aperture 551 to the cavity 547 within the cylinder 539, raising the cylinder against the force of the compression spring 548 and retracting the slips 433. A further increase in pressure in the upper cavity 507 advances the ram 530 and its associated parts including the slips 433 downwardly, keeping the slips 433 retracted.

The rate of the advance is determinable by the rate at which fluid is supplied to the upper cavity 507. In a preferred embodiment of the invention, with the valve 564 adjusted for flow from the port 569 to the port 572, the relief valve 566 is set to open at 300 lbs. per sq. in. above sea pressure and the multiple-position valve 557 is adjusted for fluid flow from a port 567 in the valve 557 communicating with the line 556 to a port 568 in the valve 557 communicating with the line 503. Fluid is supplied by the pump 554 at a pressure greater than sea pressure plus 150 lbs. per sq. in. to the upper cavity 507, whereupon the holddown 308 and apparatus suspended therefrom advance downwardly, the slips 433 remaining in the retracted position because of fluid pressure in the cavity 547. When the nose 515 has entered the cone 307 of the holddown tube 306 (see FIG. 1) and descended a suitable distance into the hold-down tube 306, the slips 433 may be set. In setting the slips, the throttling valve 553 is closed, the relief valve 562 is adjusted to sea pressure, and the multiple-position valve 564 is adjusted for fluid flow from a port 569 in the valve 564 communicating with the line 502 to a port 570 in the valve 564 communicating with the line 563, whereupon fluid escapes from the cavity 547 through the port 551 and the channel 509 and into the upper cavity 507. Fluid simultaneously escapes from the lower cavity 506, allowing the ram 530 to drop slightly under the combined influence of gravity and the coil spring 548. As the spring 548 expands it advances and sets the slips 433 in the manner previously described.

The throttling valve 553 is then opened, and the multiple-position valve 557 shifted for fluid flow from the port 568 to a port 571 in the valve 557 communicating with the line 559 in order to exert a downward force on the cylinder 504 effective to overcome the slight positive buoyancy of the chamber 310 or other chamber to which the cylinder 504 is attached. The chamber when thus seated may be sealed by the latches 485 and the annular seals 534 to the adaptor or other object on which it is positioned.

Workmen skilled in the art will understand from the disclosure that a second set of slips (not shown) may be employed and the hydraulic-operating sequence adapted to lower a negative-buoyancy chamber to engage seals in a similar manner. The combination of two sets of slips oriented oppositely with respect to each other simplifies buoyancy control.

To disengage and retract the hold-down apparatus, the multiple-position valve 564 is shifted to permit fluid flow from the port 569 to a port 572 in the valve 564 communicating with the line 565 and through the line 565 and the valve 566, which remains set at sea pressure plus 300 lbs. per sq. in. The multiple-position valve 557 is adjusted to permit fluid flow from the port 567 to the port 568. Fluid is supplied to the upper cavity 507 at a pressure greater than sea pressure plus 150 lbs. per sq. in., thereby moving the hold-down assembly downwardly and retracting the slips 433 at a rate determined by the setting of the throttling valve 553.

To raise the hold-down 308 so that the nose 515 clears the entrance cone 307, the relief valve 562 in the line 561 is adjusted to sea pressure plus 150 lbs. per sq. in., the stop 573 in the line 573a is closed, the stop valve 574 in the line 561 is opened, the multiple-position valve 564 is adjusted for fluid flow from a port 575 in the valve 564 communicating with a line 556a to the port 569, and the multiple-position valve 557 is adjusted for fluid flow from the port 568 to a port 576 in the valve 557 communicating with the line 561. Fluid is then supplied from the pump 554 at a pressure greater than sea pressure plus 300 lbs. per sq. in., thereby raising the ram 530 slightly while maintaining the slips 433 in the retracted position.

The ram chamber or cylinder 487, which controls the latches 485 (see also FIG. 6), is operated after the chamber 310 is properly seated by means of the hold-down mechanism described immediately above. To lock the latches 485, a multiple-position valve 578 is shifted for fluid flow from a port 579 in the valve 578 communicating with a line 563a which branches from the line 563 to a port 580 in the valve 578 communicating with a line 580a and from a port 581 in the valve 578 communicating with a line 581a to a port 582 in the valve 578 communicating with a line 582a. The line 580a communicates with a lower cavity 583 of the ram chamber or cylinder 487; the line 581a communicates with an upper cavity 584 in the chamber 487; and the line 582a discharges to the sump 560. The lower cavity 583 of the ram chamber or cylinder 487 is thus brought to sea pressure, while the upper cavity 584 is discharged to the sump 560 at atmospheric pressure. The ram or piston 577, which may have a peripheral sealing gasket 577a for forming a fluid-tight but slidable seal between the ram 577 and the interior wall of the ram chamber or cylinder 487, and the shaft or ram extension 486 rise, locking the latches 485 (FIG. 6) in a manner hereinbefore explained. Shifting the valve 578 for fluid flow from the port 580 to the port 579 and from the port 582 to the port 581 reverses the operation, dropping the piston 577 and ram extension or shaft 486 downwardly and releasing the latches 485 (FIG. 6) from the chamber below.

Inflation of annular seals 534 is effected by shifting a valve 585 for fluid flow from a port 586 in the valve 585 communicating with a line 563b to a port 587 in the valve 585 communicating with a line 587a. The line 563b communicates at its end opposite the port 586 with the line 563, and the line 587a communicates at its end opposite the port 587 with a low-pressure cavity 588 of an intensifier 589. Fluid is therefore supplied at sea pressure to the low-pressure cavity 588. The pressure in the low-pressure cavity 588 moves to the right as seen in FIG. 8 a ram assembly 590 having rams 590a and 590b respectively slidable within the low-pressure cavity 588 and a high-pressure cavity 591 of the intensifier 589 in sealed relation thereto. Fluid under high pressure is forced by the moving ram 590b from the high-pressure cavity 591 through a tube 592 and into an interior cavity 593 of the annular seal 534. The annular seal 534 is therefore inflated to help maintain the watertight integrity of the chamber 310 (FIG. 6). While in FIG. 8 only one seal is shown connected to the intensifier 589, it is obvious that a multiplicity of such seals may be so connected.

To deflate the seal 534, the valve 585 is shifted for fluid flow from the port 587 to a port 594 in the valve 585 communicating with a line 595. Sea pressure against the outer surface of the annular seal 534 then collapses the seal and forces the fluid within the interior cavity 593 back through the tube 592 and into the high-pressure cavity 591. The ram assembly 590 moves to the left as seen in FIG. 8, and the fluid within the low-pressure cavity 591. The ram assembly 590 moves to the left as seen in FIG. 8, and the fluid within the low-pressure cavity 588 escapes through a line 595 to the sump 560, which is of course at atmospheric pressure.

The valves 557, 564, 578 and 585 may be provided with solenoids or other apparatus facilitating remote control of the valves.

A reservoir 596 contains a hydraulic fluid 597 floating on a bed of sea water 598. A floating or otherwise movable diaphragm 599 separates the hydraulic fluid from the water. The sea water 598 is supplied through a sea valve 600a and an intake line 600 which extends through the chamber shell 476 into the sea. Thus, a continuous supply of fluid at submergence pressure is assured without the use of a pump or other powered pressure source, the sealing and latching devices upon which the safe operation of the chamber to a large extent depends being operated by sea pressure. The hold-down, latching, and sealing mechanisms herein described are therefore quite safe. For example, even if the lines 502 and 503 supplying fluid to the cylinder 504 should both be ruptured, sea pressure and the spring 548 would continue to keep the hold-downs in position; they would not release accidentally.

FIG. 9 illustrates a center-line elevator or personnel-carrying chamber 601. The center-line elevator 601 is adapted to be sealed to any of the submersible chambers shown in FIG. 1 (except, of course, the tank 340, though the tank could be so constructed as to be capable of receiving the chamber) and previously described, including the capsule 305. The elevator 601 has a lower diving-bell compartment 602 and a hollow watertight upper compartment 603, the latter of which is continuously maintained at an interior pressure of approximately one atmosphere. Depth gauges, oxygen tanks, air-purifying equipment, ballast-pumping equipment, compressed air tanks for ballast blowing, and other equipment (not shown) similar to that with which U.S. Navy submarine rescue chambers are provided are carried aboard the elevator 601. The elevator is further adapted to carry a work crew and the equipment required to effect repairs to a wellhead.

The lower compartment 602 is provided with a generally bell-shaped shell 604, a landing ring 605 projecting inwardly from the lower end of the shell 604 and acting as a back-up ring for a peripheral gasket 606 attached to the lower face thereof, an interior ring 607 extending inwardly from the shell 604 at a plane above the plane of the ring 605, and an annular inflatable seal trunk 608 extending upwardly from the ring 607. Inflatable seals 609 are positioned between the annular inflatable seal trunk 608 and a lower vessel sealing neck such as the neck 524 on the chamber 310 (see also FIG. 6). The lower compartment 602 is thus a watertight unit which may be evacuated of sea water and filled with air at a pressure of about one atmosphere and which personnel may enter.

The elevator 601 is lowered into position from the surface of the sea by means of a fall or cable 611 attached to lifting eyes 612. It is adjustable to final position by hydraulic hold-down apparatus such as the apparatus 613 similar to that shown in FIGS. 6 and 8.

The upper compartment 603 is provided with a shell 614, an upper access hatch 615 sealably covering an opening in the upper end of the shell 614 and a lower access hatch 616 sealably covering an opening in the lower shell 604, to which the upper shell 614 is attached in a watertight manner. The upper compartment 603 may also include an intermediate deck 617 having a hatch 617a covering an opening therein. In order to maintain a vertical attitude of the elevator 601 at all times, permanent ballast 618 and variable ballast tanks 619 are installed as required. The tanks 619 are preferably pumpable rather than open to the sea as in the case of "soft" tanks.

The shells 604 and 614 carry one or more guide assemblies such as the guide assembly 620 comprising an elongated spring plate 621 extending parallel to the longitudinal axis of the chamber 601 and attached to the shell 614 by explodable or other remotely-removable fastenings 633, a guide bracket 622 rigidly attached to the upper end of the spring plate 621, a swing jaw 623 mounted pivotally about a pin 632 extending laterally through the guide bracket 622, a sliding jaw 624 having a slot 631 slidable about the pin 632, concave cable guides 625 and 626 at the upper ends of the jaws 623 and 624, respectively, forming when clamped together a generally tubular guide through which the cable 314b may be passed, guide rollers 627 and 628 mounted near the ends of the swing and sliding jaws 623 and 624 opposite the guides 625, 626, the axes of rotation of the rollers being horizontal and one raised above the other, a spring spacer 629 or other biasing means connected to the swing and sliding jaws 623 and 624 and urging the guides 625, 626 inwardly against the cable 314b, and a connecting rod 629a pivotally connected to the axes of the rollers 627, 628. The guide assembly 620 is designed to cooperate successively with one of the guide cables 314b and the corresponding tapered portion 314a and rigid guide member 314 shown in FIG. 1. When it is engaged with the guide cable 314b, it is guided by means of the cable guides 625 and 626, which when clamped together form a replaceable sliding shoe presenting an inner wear surface to the cable 314b. The wear surface is made of bronze, plastic, or some other material appreciably softer than the cable over which it slides.

The swing and sliding jaws 623 and 624 both extend in opposite directions from their connection with the bracket 622, the wear surfaces or guides 625, 626 being at their upper and the rollers 627 and 628 at their lower ends.

The structure at the lower end of the spring plate 621 is similar to that at the upper end and need not be described in full detail.

As the chamber 601 descends and the lower part of the guide assembly 620 encounters the tapered portion 314a (FIG. 1), the guide rollers 627 and 628 are forced apart against the resistance of the spring spacer 629. The guide rollers 627 and 628 are each shaped with a waist 630 to facilitate centering of the rollers about the tapered portion 314a and the rigid guide member 314.

The separating of rollers 627 and 628 connected to the lower ends of the sliding jaw 624 and the swing jaw 623, respectively, by the tapered portion 314a forces the sliding jaw 624 upwardly, the slot 631 sliding over the pin 632. The pin 632 is, of course, secured through the slot 631 and through holes in the swing jaw 623 and the bracket 622.

The movement of the sliding jaw 624 is accompanied by an inward swinging movement of the lower end of the swing jaw 623. These movements cause the cable guides 625 and 626 to separate and assume a position to clear the rigid guide member 314. The guiding function is thereupon performed by the rollers 627 and 628.

The use of rigid guide members 314 at the lower ends of the guide cables 314b facilitates a more accurate centering of the sealing members on the chamber 601 than would be possible if cables alone were used. Exact centering of a large chamber at the bottom of the sea by remote control is not always possible. Therefore, the seals for the joining of the various chambers constructed in accordance with the invention are given a certain flexibility; in particular, the guide assembly 620 is mounted on the spring plate 621 in order to permit a moderate movement of the chamber 601 in relation to the rigid guide member 314 while the hold-down and clamping mechanisms are effecting the mutual sealing of adjacent chambers.

Inasmuch as the fastenings joining the spring plate 621 to the shell 614 are explodable or otherwise remotely-removable, the chamber may be released independently from within if the guide mechanism become fouled, to be returned to the surface either by its own buoyancy or by means of the fall 611.

A weather deck 634 at the upper end of the chamber 601 and railing 635 around the weather deck facilitate use of the chamber 601 on the surface of the sea.

The upper hatch 615 sealably enclosing an opening formed in the upper end of the shell 614 may be replaced with a sealing neck similar to the one to which the lower end of the chamber 601 is sealed, to enable an auxiliary chamber to be lowered to the chamber 601 for rescue or repair purposes in the event of an emergency.

The chamber 601 may carry its own air supply or receive air through lines extending to the surface of the sea. If the chamber is surface-supported in this respect, the use of air-operated tools and other equipment may be advantageous. Communication with the surface of the sea may be by a cable trailed by the elevator 601 or by means of sonar.

Hold-down apparatus 613 attached to the exterior of the chamber 601 is similar to that previously described.

Figure 10:
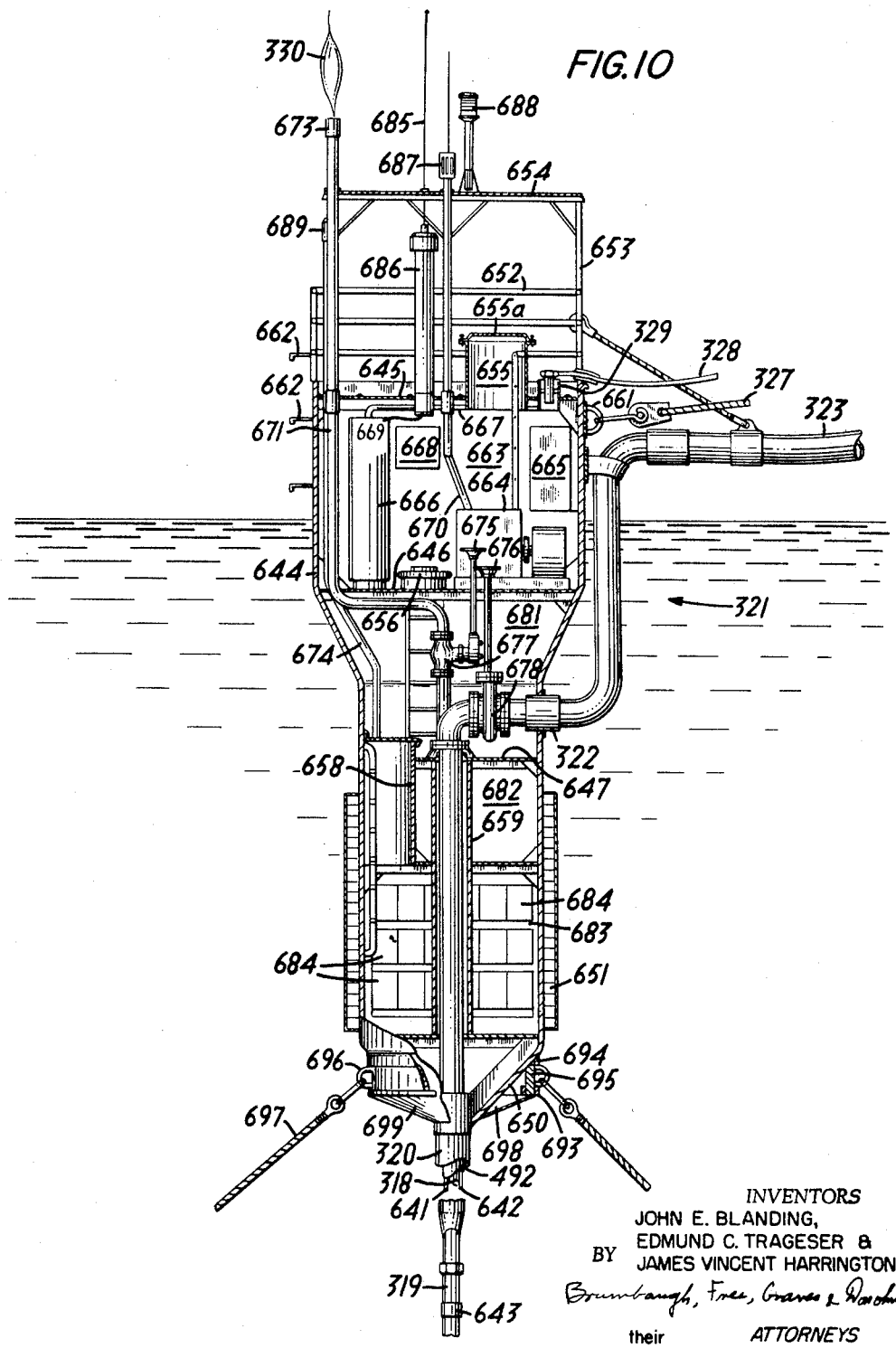
FIG. 10 is a partly-sectioned elevational view of a production buoy constructed in accordance with the invention.

FIG. 10 shows the production buoy 321 (shown also in FIG. 1) in detail. The buoy 321 is elongated along an axis and designed to float with its axis in an upright position on the surface of the sea and to support the operations of the various devices located at the wellhead as described previously. In particular, the buoy 321 is adapted to transmit signals to and receive signals from the equipment at the wellhead, to supply power required during the various phases of the well operation, and to support a portion of the weight of the flexible line or trunk 319. The line or trunk 319 comprises a gas exhaust line 318, an oil discharge line 492, a power cable 641, and signal cables 642. The various lines and cables are clamped together to form the line or trunk 319 by clamps 643 spaced at various locations between the surface and the bottom of the sea. The gas exhaust line 318 and oil discharge line 492 are flexible and may be made of a material such as reinforced rubber. The walls of the lines 318 and 492 need not have sufficient strength to enable the lines when empty to withstand the sea pressure without collapse. The ends of the line or trunk 319 (i.e., the portion near the production buoy 321 and that near the separator chamber or chambers 311) are rigid and capable of withstanding the local sea pressure without collapse.

The buoy 321 comprises an outer watertight shell 644, a weather deck 645 at the upper end of the shell 644, an engine flat 646 secured to the shell 644 beneath the weather deck 645 and adapted to support power apparatus and other equipment, a fuel tank top 647 secured to the shell 644 beneath the engine flat 646, a conical buoy bottom 650 comprising the lower end of the shell 644, permanent ballast 651 attached to the exterior of the shell 644 near its lower end, a railing 652 around the weather deck 645, one or more vertically-disposed awning stanchions 653 attached to the weather deck 645 near the edges thereof, a metal awning 654 supported by the upper ends of the awning stanchions 653, an outer engine-flat access trunk 655 projecitng upwardly from the weather deck 645 and provided with an upper hatch 655a, a valve compartment hatch 656 sealing an opening formed in the engine flat 646, a battery access trunk 658 extending from a valve compartment 681 to a storage battery compartment 683, a piping trunk 659 extending vertically through a fuel tank 682 and the storage battery compartment 683, a conductor extension or rigid connection 320 projecting downwardly from the lower end of the conical buoy bottom 650, a pickup buoy and mooring eye 661 and a boarding ladder 662.

The interior of the buoy 321 is divided into a number of compartments. A machinery and control compartment 663 of which the engine flat 646 constitutes the deck and the weather deck 645 forms the overhead contains such equipment as a motor-generator set 664 of sufficient size to handle the current requirements of the controls, lights, blowers and the like; a panel 665 housing various controls; a power panel 666 for handling both the operating power from the motor-generator 664 and the pumping power transmitted from the pickup vessel or tanker 324 (FIG. 1) to the wellhead for recovery of stored oil; a pumping power cable 667; radio transmitting and receiving equipment 668 by means of which signals can be transmitted for remote control of the well; an air duct or vent 669; a motor exhaust line 670; a gas vent line 671 provided with an automatic igniter 673 for igniting the flare 330; a battery exhaust line 674; and hand wheels 675 and 676 for controlling a gas discharge valve 677 and an oil discharge valve 678 in the valve compartment 681.

The valve compartment 681 is immediately beneath the machinery and control compartment 663. The fuel tank 682 beneath the valve compartment 681 supplies the motor-generator 664 with fuel for protracted periods of time. Under certain conditions, the engine for the motor-generator 664 may use gas from the well as fuel.

The lowest compartment in the buoy 321 is the storage battery compartment 683, which contains batteries 684 and associated equipment.

On or above the weather deck 645 are a radio antenna 685, an air intake trunk 686, an engine exhaust muffler 687, required navigational aids such as the light 688 and an audible signal, a battery exhaust vent 689, the watertight power connection 329 to which the power cable 328 is attached by the pickup vessel 324 (FIG. 1), and the pickup buoy pennant or mooring line 327 secured permanently at one end to the mooring eye 661 and detachably at the other end to the pickup vessel 324 (FIG. 1).

Buoy mooring gear is attached to the conical bottom 650. The buoy mooring gear comprises a sliding or roller bearing 693, a retainer ring 694 attached to the shell 644, and a mooring ring 695 on the exterior of the buoy 321 and rotatable within the bearing 693 about the axis of the buoy 321. Mooring eyes 696 adapted to receive mooring lines 697 are attached to the mooring ring 695. The bearing 693 is supported by bearing brackets 698 and a cover plate 699. This mooring arrangement enables the buoy 321 and the attached pickup buoys and lines to swing independently of the permanent buoy mooring lines 697. Under some conditions and in some locations such an arrangement may be undesirable, in which case the rotating mooring ring 695 may be locked in one position and the pickup buoys and the oil discharge lines taken aboard the pickup vessel. The oil discharge line is then disconnected, brought to the surface alongside the buoy 321, and there made fast in such a manner as to facilitate reconnecting upon the next visit of the pickup vessel. In the light of the preceding description, other systems of mooring within the spirit and scope of the invention will suggest themselves to workmen skilled in the art.

During the pickup operation, power and oil-discharge lines are connected, the former to supply power to the transfer pump located at the wellhead and the latter to take aboard oil pumped to the surface of the sea.

The burning of gas to form a flare in an offshore well is common. While the flares are seldom accidentally extinguished even under the severest weather conditions, the pickup vessel 324 need be separated from the buoy 321 by only a short distance in order to avoid the danger of an unfriendly fire. Preferably, of course, the pickup vessel 324 is not down wind of the buoy 321.

It is apparent that the various embodiments described here and in said United States Patent No. 3,353,364 provide for a high degree of division of function in underwater well construction and operation. Only the equipment which is actually needed for the operation of the well need be left at the wellhead. The remainder of the equipment, namely the drilling equipment and the servicing equipment, can be employed elsewhere. Further, whenever it is necessary to make inspection or repairs it is possible to do so with a minimum of personnel and equipment. Moreover, the capsule is safely on the bottom of the ocean and away from the destructive action of wind and waves.

Thus there is provided in accordance with the invention a novel product handling system for underwater wells.

The representative embodiment described above is susceptible of modification in form and detail within the spirit and scope of the invention. For example, it is adapted to drilling not only for oil but also for such other resources as sulphur and natural gas.

Also, if the apparatus of the invention is to be used under conditions such that the separation of gas from oil at the bottom of the sea is not desired, the chamber 310 may be replaced with a pumping station using the same types of remote connectors.

We claim:

1. Underwater well apparatus comprising production equipment mounted adjacent to an underwater wellhead, well-product-storage means mounted under water, means connected to said production equipment and said storage means for transporting a well product therebetween, buoy means floatable on the water, means connected to said buoy means and said production equipment for transporting a well product from said production equipment to said buoy means, and valve means for directing movement of a well product from said production equipment to and from said storage means and from said production equipment to said buoy means.

2. Apparatus according to claim 1 wherein said well-product-storage means is pressure-compensated.

3. Apparatus according to claim 1 wherein said production equipment includes separator means for separating gas and oil from said wellhead.

4. Apparatus according to claim 1 wherein said buoy means includes means for flaring at least a portion of said well product.

5. Underwater well apparatus comprising production equipment adjacent to an underwater wellhead, well-product-storage means mounted under water, means connected to said production equipment and said storage means for transporting a well product therebetween, buoy means floatable on the water, means connected to said buoy means and said production equipment for transporting a well product from said production equipment to said buoy means, second well-product-storage means for storing a well product, means connected to said buoy means and said second well-product-storage means for transporting a well product from said buoy means to said second well-product-storage means, and valve means for directing movement of a well product from said production equipment to and from said underwater storage means and from said production equipment to said buoy means and said second well-product-storage means.

6. Apparatus as defined in claim 5 in which said second well-product-storage means is a surface vessel.

7. Apparatus as defined in claim 6 and further comprising power lines extending from said surface vessel to said buoy means and from said buoy means to said production equipment.

8. Apparatus as defined in claim 6 and further comprising second buoy means connected to said production equipment and floatable in the water for marking the position of said production equipment.

9. Underwater well apparatus comprising a two-ended hollow watertight separator chamber formed with an exterior sealing neck at one end and an interior configuration at the other end substantially complemental to said sealing neck, at least one hollow watertight separator mounted on the exterior of said chamber, and tubing means connected to said chamber and said separator for transporting a mixture of oil and gas from an underwater well between said chamber and said separator, whereby said oil and gas are separable from each other.

10. Underwater well apparatus comprising a two-ended hollow watertight separator chamber formed with an exterior sealing neck at one end and an interior configuration at the other end substantially complemental to said sealing neck, means mounting said chamber under water adjacent to an underwater wellhead, at least one hollow watertight separator mounted on the exterior of said chamber, first tubing means connected to said chamber and said separator for transporting a mixture of oil and gas from an underwater well from said chamber to said separator, whereby said oil and gas are separated from each other, second tubing means for transporting said separated oil from said separator to said chamber, third tubing means extending from said chamber to the surface of the water, fourth tubing means extending from said chamber to underwater storage means, and valve means connected to said third and fourth tubing means for selectively connecting said second tubing means to one of said third and fourth tubing means.

11. Apparatus as defined in claim 10 and further comprising fifth tubing means extending from said separator to the surface of the water for transporting said separated gas from said separator to the surface of the water.

12. Apparatus as defined in claim 10 and further comprising coupling means connected to said first tubing means for coupling said first tubing means with an underwater well.

13. Apparatus as defined in claim 12 in which said coupling means is hydraulically actuated.

References Cited

UNITED STATES PATENTS

| | | | |
|---|---|---|---|
| 2,594,105 | 4/1952 | Watts | 137—236 X |
| 2,990,796 | 7/1961 | Cole et al. | 114—5 |
| 3,063,507 | 11/1962 | O'Neill et al. | 166—.5 X |
| 3,291,210 | 12/1966 | Johnstone et al. | 166—.6 |

ERNEST R. PURSER, Primary Examiner

U.S. Cl. X.R.

114—.5; 137—122, 236; 166—267